(12) United States Patent  
Lobo

(10) Patent No.: US 6,631,068 B1  
(45) Date of Patent: Oct. 7, 2003

(54) SEGMENTED METALLIZED FILM

(75) Inventor: Edward M. Lobo, Seymour, CT (US)

(73) Assignee: Parallax Power Components LLC, Bridgeport, CT (US)

( * ) Notice: Subject to any disclaimer, the term of this patent is extended or adjusted under 35 U.S.C. 154(b) by 0 days.

(21) Appl. No.: 10/244,426

(22) Filed: Sep. 17, 2002

(51) Int. Cl.[7] .................. H01G 4/015; H01G 4/005
(52) U.S. Cl. ...................... 361/273; 361/303
(58) Field of Search .................. 361/272, 273, 361/301.2–301.5, 302, 303, 304, 305, 306.1, 306.3, 309, 311, 323

(56) References Cited

U.S. PATENT DOCUMENTS

| | | |
|---|---|---|
| 4,433,359 A | 2/1984 | Hamabe et al. |
| 4,897,761 A | 1/1990 | Lobo et al. |
| 5,107,393 A | 4/1992 | Lobo |
| 5,136,462 A | 8/1992 | Steiner |
| 5,151,660 A | 9/1992 | Powers et al. |
| 5,394,294 A | 2/1995 | Mei et al. |
| 5,610,796 A | 3/1997 | Lavene |
| 5,680,290 A | 10/1997 | Akai et al. |
| 5,933,947 A | 8/1999 | Minamizawa et al. |
| 5,953,202 A | 9/1999 | Walters et al. |
| 6,040,038 A | 3/2000 | Momose |
| 6,127,042 A | 10/2000 | Tamic |
| 6,370,008 B1 | 4/2002 | Vetter |

FOREIGN PATENT DOCUMENTS

| | | |
|---|---|---|
| JP | 5-251266 | 9/1993 |
| JP | 6-267786 | 9/1994 |
| JP | 3-211809 | 9/2001 |

OTHER PUBLICATIONS

"Capacitors for AC Voltage Application" Magne Tek Brochure, No Date.

*Primary Examiner*—Dean A. Reichard  
*Assistant Examiner*—Eric Thomas  
(74) *Attorney, Agent, or Firm*—Shaw Pittman LLP

(57) ABSTRACT

A segmented metallized film having a dielectric film, a metallized layer, and at least one fuse disposed within each segment of a plurality of segments along a center margin of the metallized layer. The metallized layer is on a portion of the dielectric film such that the dielectric film has a metallized edge, an unmetallized edge, and an uncoated area between the metallized layer and the unmetallized edge. The center margin is substantially parallel to the machine direction of the film. The center margin is disposed in the metallized layer approximately equidistant to the metallized edge and to the unmetallized edge. The metallized layer has a plurality of transverse margins running from the center margin to the uncoated area. The center margin and the plurality of transverse margins define the plurality of segments.

20 Claims, 10 Drawing Sheets

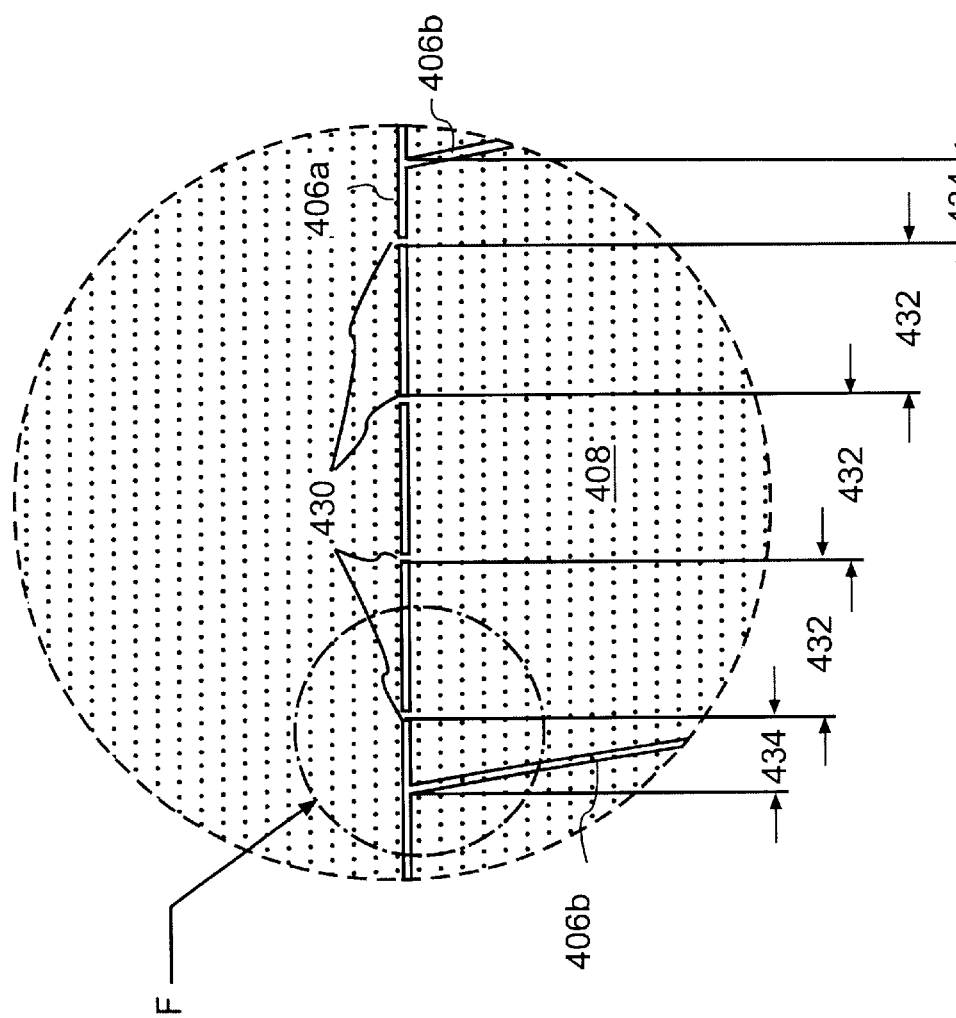

SEGMENTED METALLIZED FILM

BACKGROUND

1. Field of the Invention

The present invention relates generally to metallized film used in capacitors and, more particularly, to a segmented metallized film having fuses that protect a capacitor in the event of a short circuit.

2. Background of the Invention

Metallized film capacitors are typically made of two tightly wound sheets wrapped around a core. Each sheet is composed of a dielectric film having a metallized layer on one face of the film. The metallized layer extends to one edge of the face to provide a metallized edge. The metallized layer stops short of the opposing edge of the face to provide an unmetallized edge. The unmetallized edges of the two sheets are placed opposite to each other when the sheets are stacked and wound together, such that only one metallized edge is available for connecting to a lead at each end of the rolled capacitor. Each end is sprayed with a conductive metal that bonds with the sheet having a metallized edge at that end. Leads are then attached to each sprayed end to form the capacitor electrodes. The rolled capacitor is then placed in a housing and impregnated with a dielectric fluid or encapsulated in a resin.

FIG. 1 illustrates a conventional metallized film capacitor 100. As shown, capacitor 100 includes two metallized films 102 placed on top of each other and wound around a core (not shown) to form a wound section 104. Each metallized film 102 includes a dielectric film 106 that is coated on one side with a metallized layer 108. The metallized layers 108 of the dielectric films 106 are separated by the unmetallized side of at least one of the dielectric films 106.

Each metallized film 102 includes a metallized edge 110 and an unmetallized area 112. The metallized edges I 10 of the metallized films 102 are oppositely positioned during winding of the metallized films 102. Accordingly, the unmetallized areas 112 are also oppositely positioned. In this manner, after tightly winding metallized films 102 around the core, only one metallized edge 110 is available for connecting to a lead at each end of wound section 104. The ends of wound section 104 are covered with a conductive metallic spray 114. Leads 116 are connected to conductive metallic spray 114 to form electrodes 118.

For purposes of defining the present invention, the direction in which metallized films 102 are wound is referred to herein as the machine direction and is represented by arrow 120.

Metallized film capacitors are non-polar and "self-clearing" (which is also referred to as "self-protected" or "self-healing"). Thus, when a metallized film capacitor is exposed to, for example, an excessive voltage, a short circuit develops through the dielectric film, between the metallized layers (i.e., plates) of the capacitor. The current from the short circuit vaporizes small areas of the metallized layer near the short circuit. The vaporization of the metallized layer opens the short circuit, after which the capacitor returns to normal function, usually with only a small reduction in microfarads. The typical "end of life" of these types of capacitors are "opens" caused by the accumulated, gradual loss of dielectric film metallized electrodes from repeated "self-clearing" or activation of protective devices (e.g., interrupters).

To minimize the loss in capacitance resulting from the loss of a portion of the metallization layer during a short circuit, manufacturers have developed "segmented" or "patterned" metallization films. These segmented metallization films include unmetallized margin areas that divide the metallization layer into multiple metal segments interlinked by small fuses. If a short circuit occurs within a segment, the fuses that interlink that segment to adjacent segments open and remove the segment from the capacitor, thereby avoiding a catastrophic failure of the capacitor and the circuit in which the capacitor is used.

FIGS. 2A–2C and 3A–3C illustrate two examples of conventional self-protected metallized film patterns. FIGS. 2A–2C illustrate the "13M" pattern used by Bollore of Ergue-Gaberic, France to make self-protected metallized polypropylene sections. FIGS. 3A–3C illustrate a segmented film pattern manufactured by Steinerfilm Inc. of Williamstown, Massachusetts.

FIG. 2A shows a segmented metallized film 200 made of a dielectric film 202 coated with a metallized layer 204. Metallized layer 204 covers most of dielectric film 202, including a metallized edge 206. Opposite the metallized edge 206, metallized layer 204 stops short of an unmetallized edge 208 to provide an uncoated area 210 (which is approximately 2.50 mm wide). Metallized layer 204 includes a lattice pattern of margin areas 212 that divide metallized layer 204 into multiple segments 214. Approximately 6.0 mm from metallized edge 206, lattice pattern 212 includes an edge margin area 216 that contains edge fuses 218. The width of edge margin area 216 is approximately 0.2 mm. The length of edge fuses 218 is approximately 0.6 mm.

FIG. 2B illustrates an enlarged view of a segment 214 of metallized film 200. As shown, the margin areas of lattice pattern 212 include a segment fuse 220 along each length of margin area that encloses segment 214. Segment fuses 220 interconnect adjacent segments 214. In this manner, when a faulting segment develops a short circuit, the segment fuses that interconnect the faulting segment to adjacent segments break, thereby isolating the faulting segment.

FIG. 2C illustrates in greater detail a fuse 220 and the margin areas of lattice pattern 212 in the area of fuse 220. As shown, the margin areas of lattice pattern 212 on either side of fuse 220 are squared. The width 224 of the margin areas of lattice pattern 212 is approximately 0.15 mm. The length of fuse 220 is approximately 0.30 mm.

FIG. 3A shows another example of a segmented metallized film 300 made of a dielectric film 302 coated with a metallized layer 304. Metallized layer 304 covers most of dielectric film 302, including a metallized edge 306. Opposite the metallized edge 306, metallized layer 304 stops short of an unmetallized edge 308 to provide an uncoated area 310 (which is approximately 2.50 mm wide). Metallized layer 304 includes a lattice pattern of margin areas 312 that divide metallized layer 304 into multiple segments 314. Approximately 4.7 mm from metallized edge 306, lattice pattern 312 includes an edge margin area 316 that contains edge fuses 318. The width of edge margin area 316 is approximately 0.33 mm. The length of edge fuses 318 is approximately 1.5 mm.

FIG. 3B illustrates an enlarged view of a segment 314 of metallized film 300. As shown, the margin areas of lattice pattern 312 include a segment fuse 320 along each length of margin area that encloses segment 314. Segment fuses 320 interconnect adjacent segments 314. In this manner, when a faulting segment develops a short circuit, the segment fuses that interconnect the faulting segment to adjacent segments break, thereby isolating the faulting segment.

FIG. 3C illustrates in greater detail a fuse 320 and the margin areas of lattice pattern 312 in the area of fuse 320. As shown, the margin areas of lattice pattern 312 on either side of fuse 320 are rounded. The width 324 of the margin areas of lattice pattern 312 is approximately 0.33 mm. The length of fuse 320 is approximately 0.24 mm.

Comparing film 200 of FIGS. 2A–2C to film 300 of FIGS. 3A–3C, film 300 has fewer and larger segments, with wider margin areas. That is, the width 322 of FIG. 3B (approximately 9.4 mm) is greater than width 222 of FIG. 2B (approximately 7 mm). In terms of the width of the margin areas that define the lattice pattern, segmented metallized film 300 has wider margin areas. That is, the width 324 of FIG. 3C (approximately 0.33 mm) is greater than the width 224 of FIG. 2C (approximately 0.15 mm). In either case, however, there is a substantial amount of unmetallized area due to the lattice pattern of the margin areas. These patterns therefore reduce the active area of metallization an average of 8–15%, representing an inefficient and costly use of the metallized film.

In addition to this loss in active area, the proximity of the edge margins 216 and 316 to the metallized edges 206 and 306, respectively, causes some of the active electrode area to remain in contact with energy sources even after a fault occurs. In the area near metallized edges 206 and 306, metallized layers 204 and 304, respectively, tend to be heavier and less uniformly applied. Consequently, the first line of fuses in the edge margins 216 and 316 tends to be in an area of heavy metallization (also referred to as the "heavy edge") and, even when open circuited, can leave some active electrode. Although these patterns still typically fail safely at their ends of life cycle, it would be more desirable to completely remove the active electrode from energy sources when a fault occurs.

SUMMARY OF THE INVENTION

The present invention provides a segmented metallized film having fuses in approximately the middle of the film sheet, outside the area of heavy metallization. In comparison to the films of the prior art, the present invention uses less margin area and therefore minimizes the uncoated area of the metallized film. For example, instead of the prior art's 8–15% loss in active area, the present invention can limit the loss due to margin areas to as little as a 2–3%. While providing this more efficient use of the active electrode area, the segmented metallized film of the present invention still allows a capacitor to fail safely at the end of its life and to meet commonly accepted performance criteria under normal operating conditions.

An embodiment of the present invention provides a segmented metallized film having a dielectric film, a metallized layer, and at least one fuse disposed within each segment along a center margin of the metallized layer. The metallized layer is on a portion of the dielectric film such that the dielectric film has a metallized edge, an unmetallized edge, and an uncoated area between the metallized layer and the unmetallized edge. The center margin is substantially parallel to the machine direction of the film. The center margin is disposed in the metallized layer approximately equidistant to the metallized edge and to the unmetallized edge. The metallized layer has a plurality of transverse margins running from the center margin to the uncoated area. The center margin and the plurality of transverse margins define a plurality of segments. At least one fuse is disposed in the center margin within each segment of the plurality of segments.

In an embodiment of the present invention, the center margin is offset from the centerline between the metallized and unmetallized edges so that when the fuses open the circuit, all of the active area is removed from the external circuit. In addition, offsetting the center margins of two metallized films of a capacitor separates the fuses so that any heat generated by I²R losses in the fuse area is not concentrated in the center of the section.

The fuse arrangement of the present invention enables capacitors to fail safely, while at the same time, maximizing active area. As a comparison, capacitors made with the conventional patterns shown in FIGS. 2A–2C and 3A–3C generally show only the first and second lines of fuses open circuiting, when tested under the fault conditions specified in UL 810. The remaining patterns and fuses are removed from the circuit when the first line of fuses operates. In contrast, with the present invention, only the segmentation is needed to bring the capacitor safely toward an open circuit. Thus, instead of the two lines of fuses used in the prior art, which wastes the active area, the present invention provides only one line of fuses, thereby maximizing the use of the active area.

BRIEF DESCRIPTION OF THE DRAWINGS

FIG. 4B is a schematic diagram showing an enlarged view of View E of FIG. 4A.

DETAILED DESCRIPTION OF THE INVENTION

Figure 1:
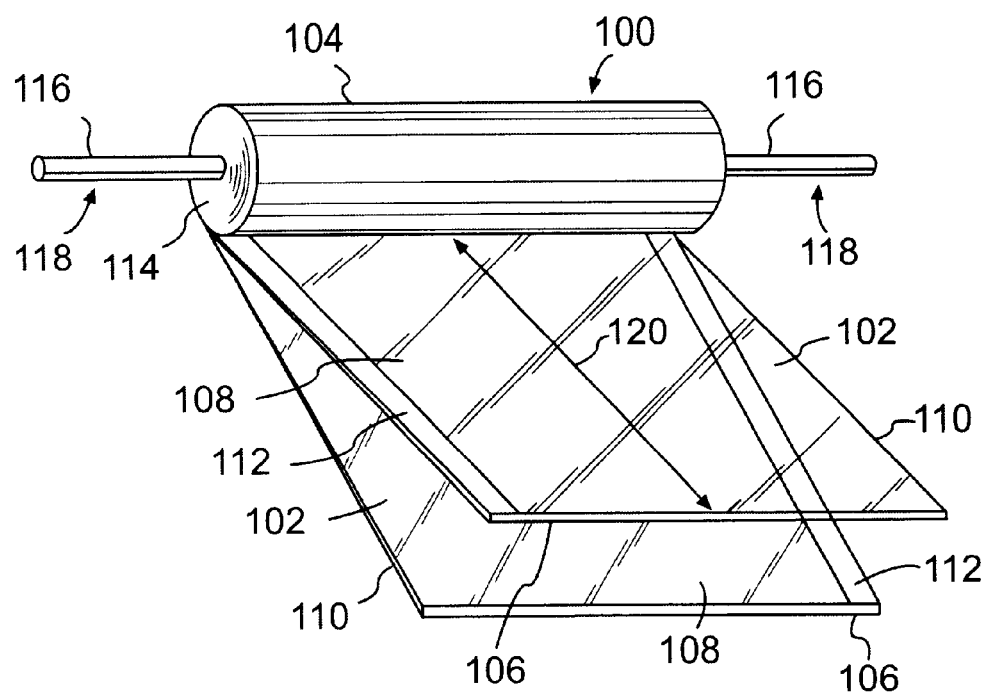
FIG. 1 is a schematic diagram of a conventional metallized film capacitor.
Figure 2A:
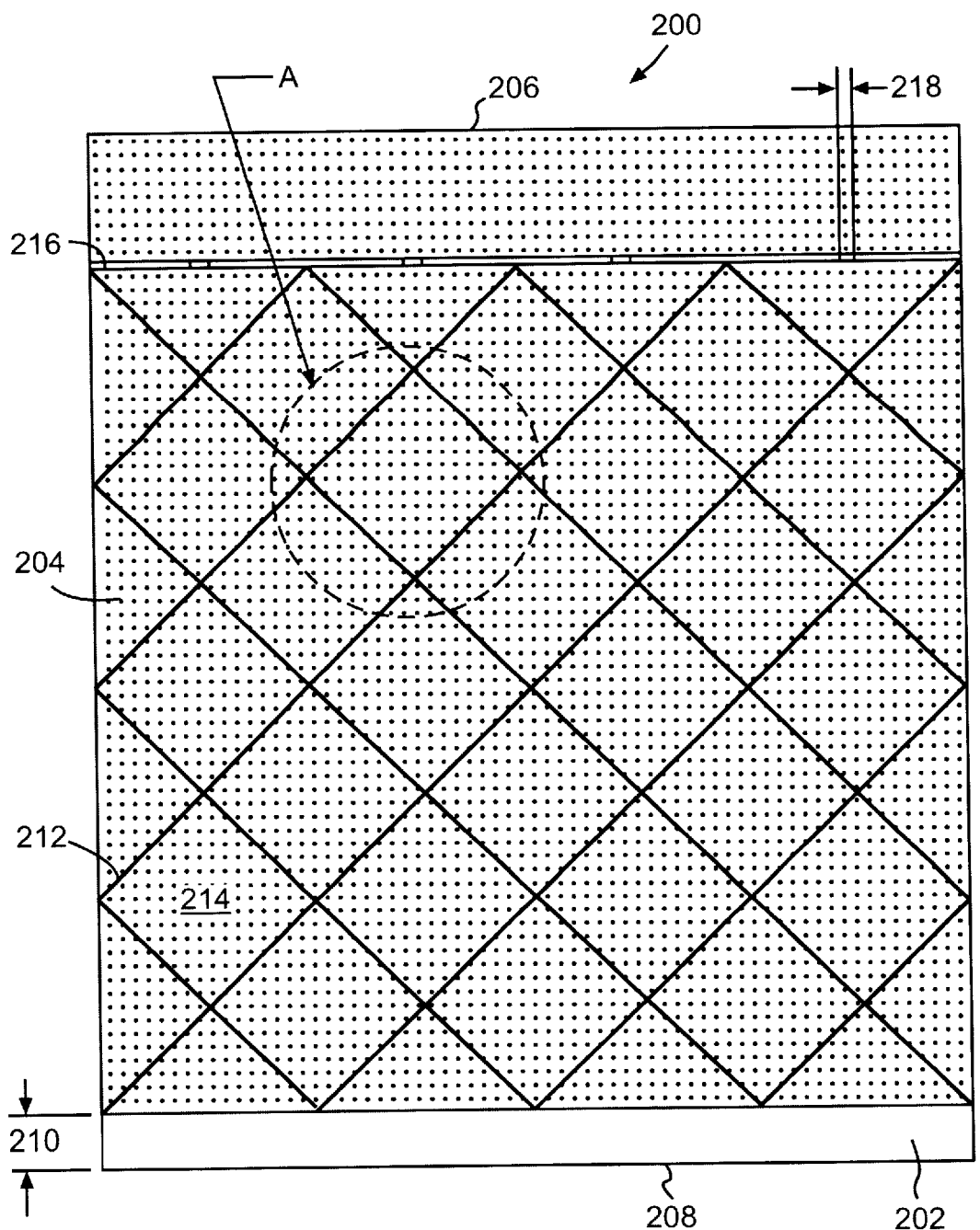
FIG. 2A is a schematic diagram of a conventional segmented film produced by Bollore.
Figure 2B:
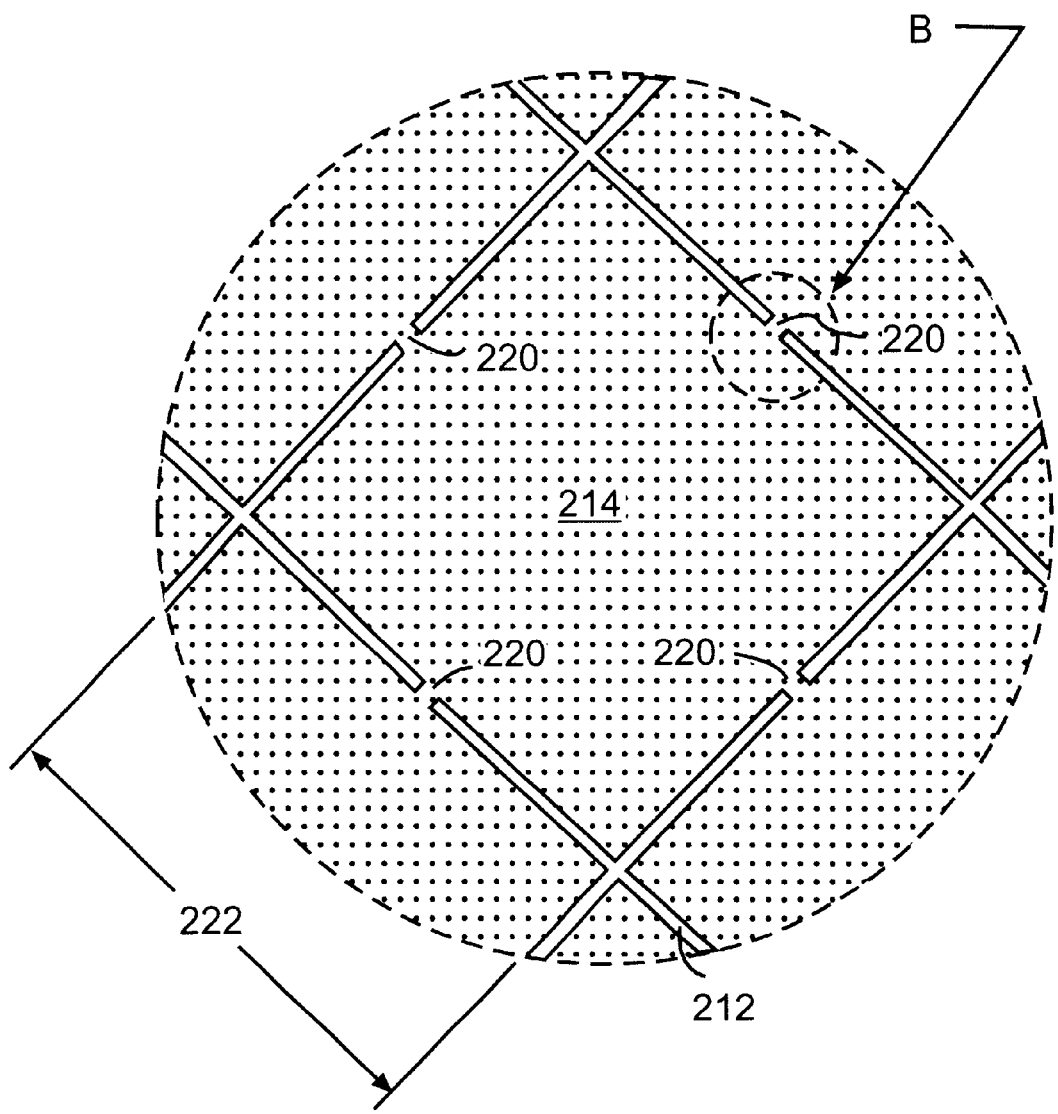
FIG. 2B is a schematic diagram showing an enlarged view of View A of FIG. 2A.
Figure 2C:
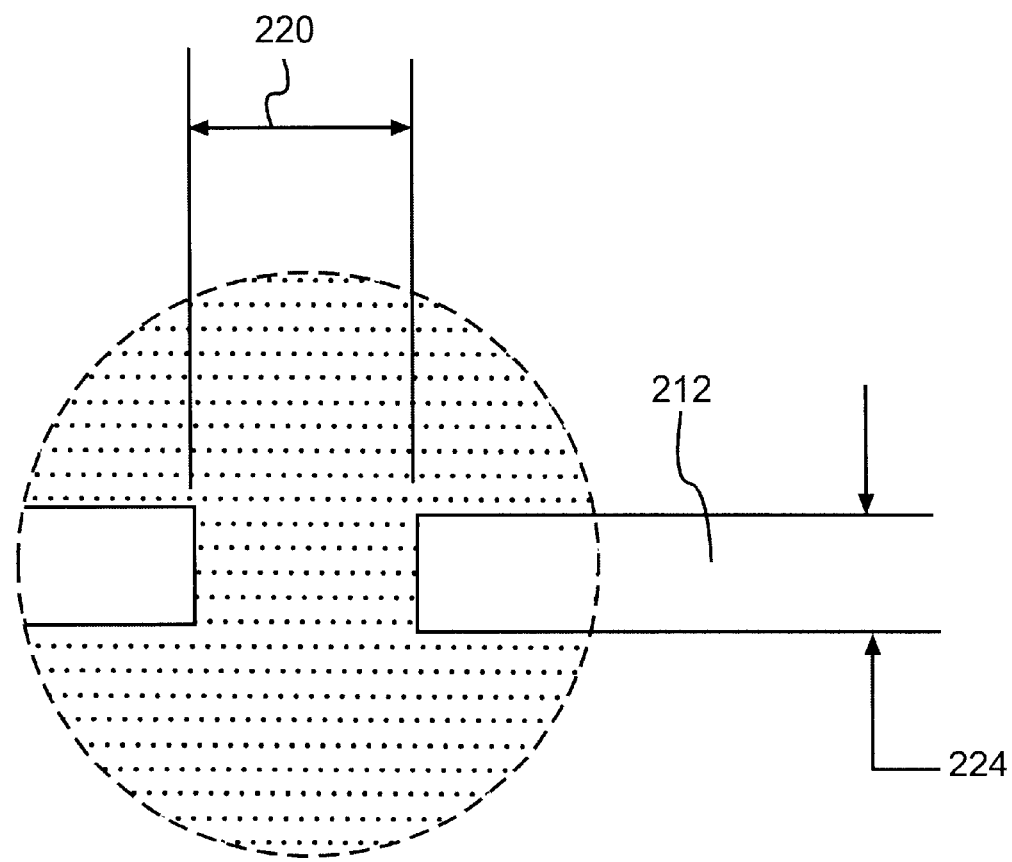
FIG. 2C is a schematic diagram showing an enlarged view of View B of FIG. 2B.
Figure 3A:
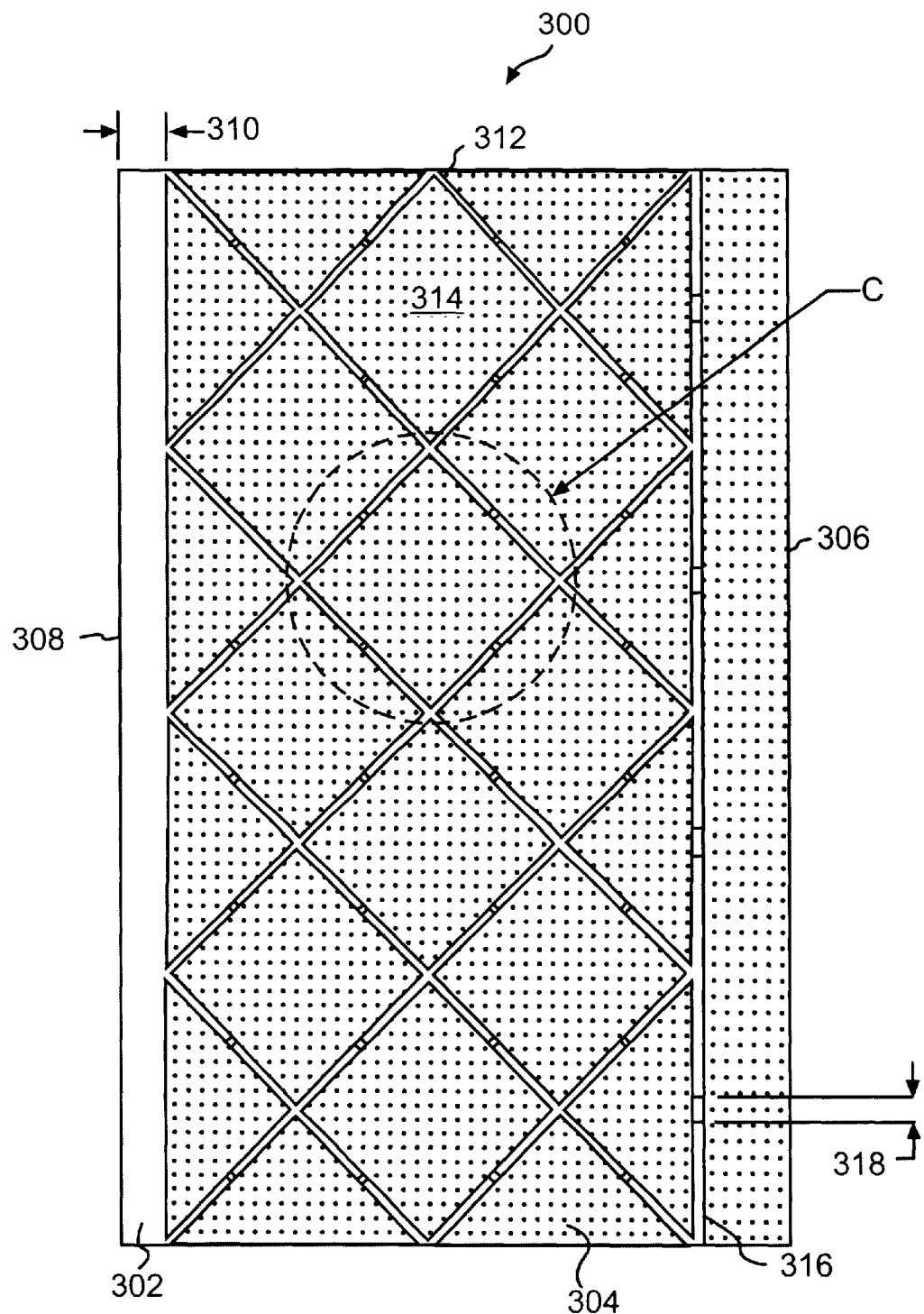
FIG. 3A is a schematic diagram of a conventional segmented film produced by Steinerfilm Inc.
Figure 3B:
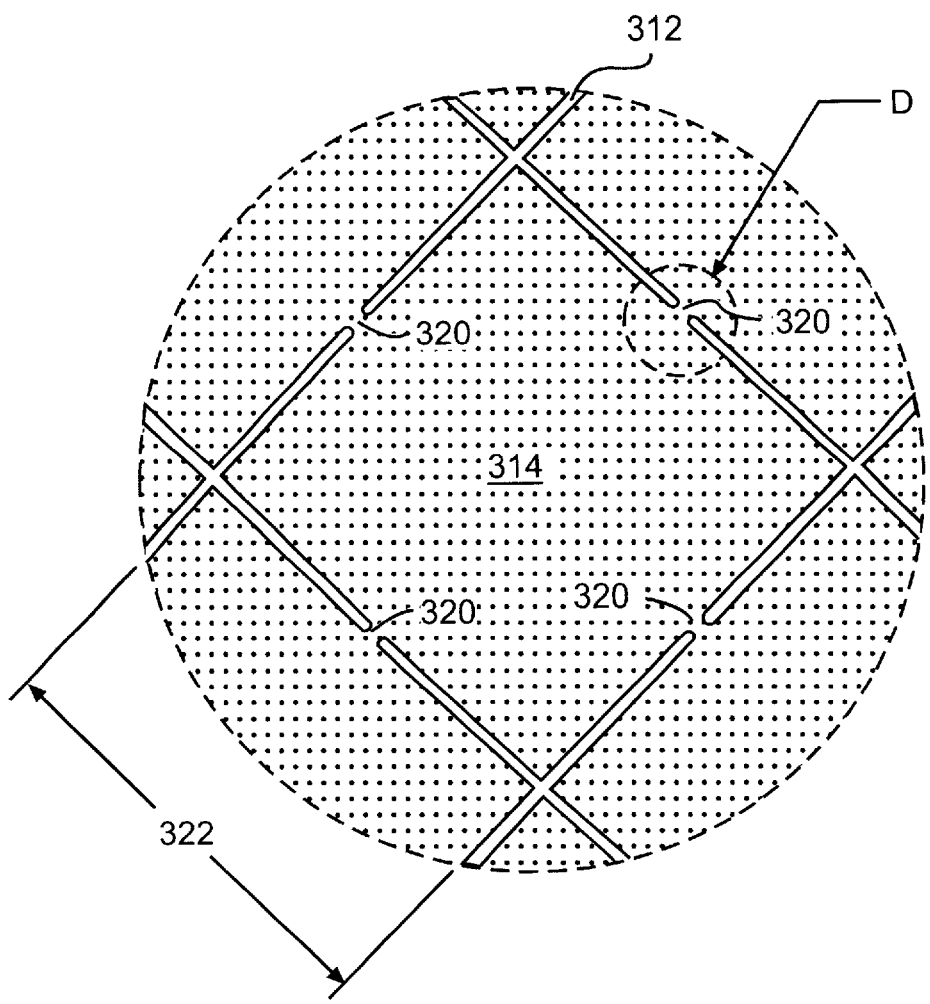
FIG. 3B is a schematic diagram showing an enlarged view of View C of FIG. 3A.
Figure 3C:
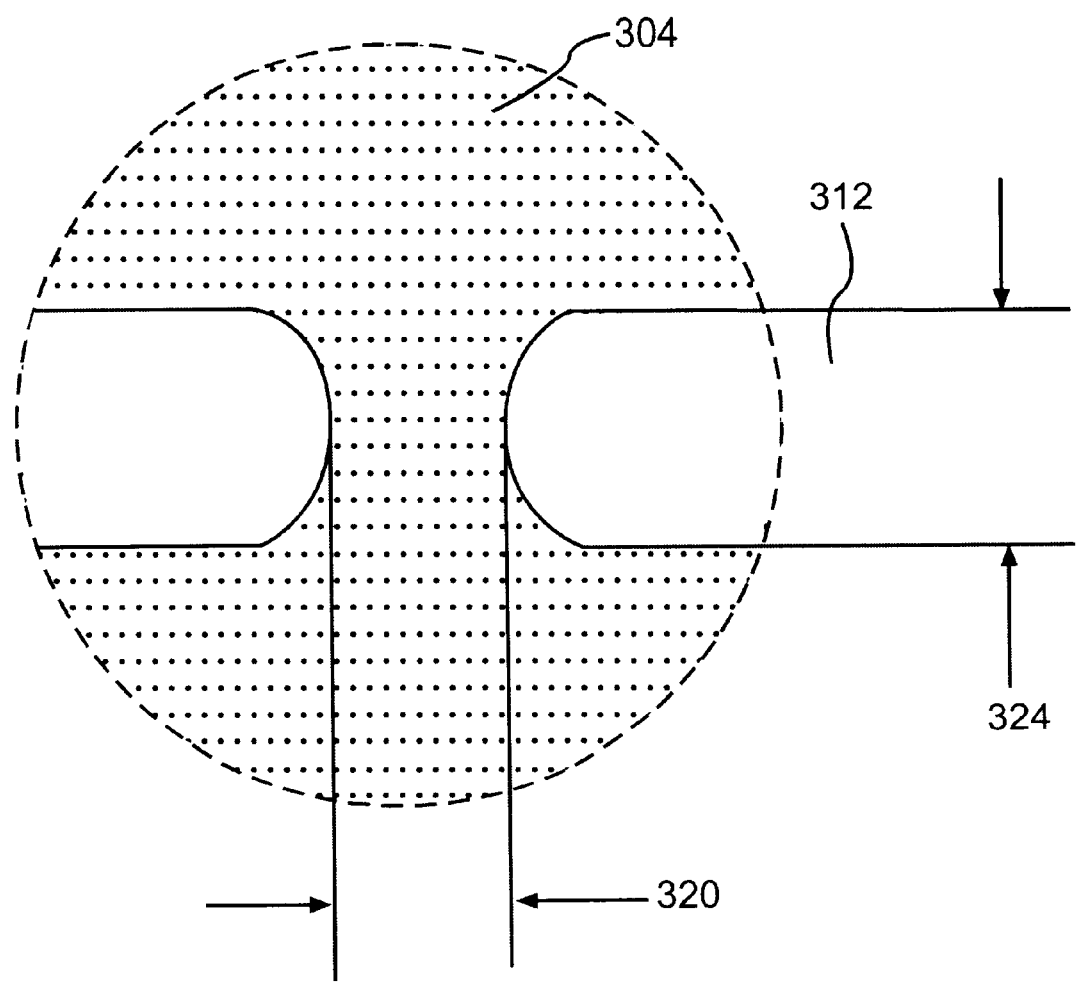
FIG. 3C is a schematic diagram showing an enlarged view of View D of FIG. 3B.
Figure 4A:
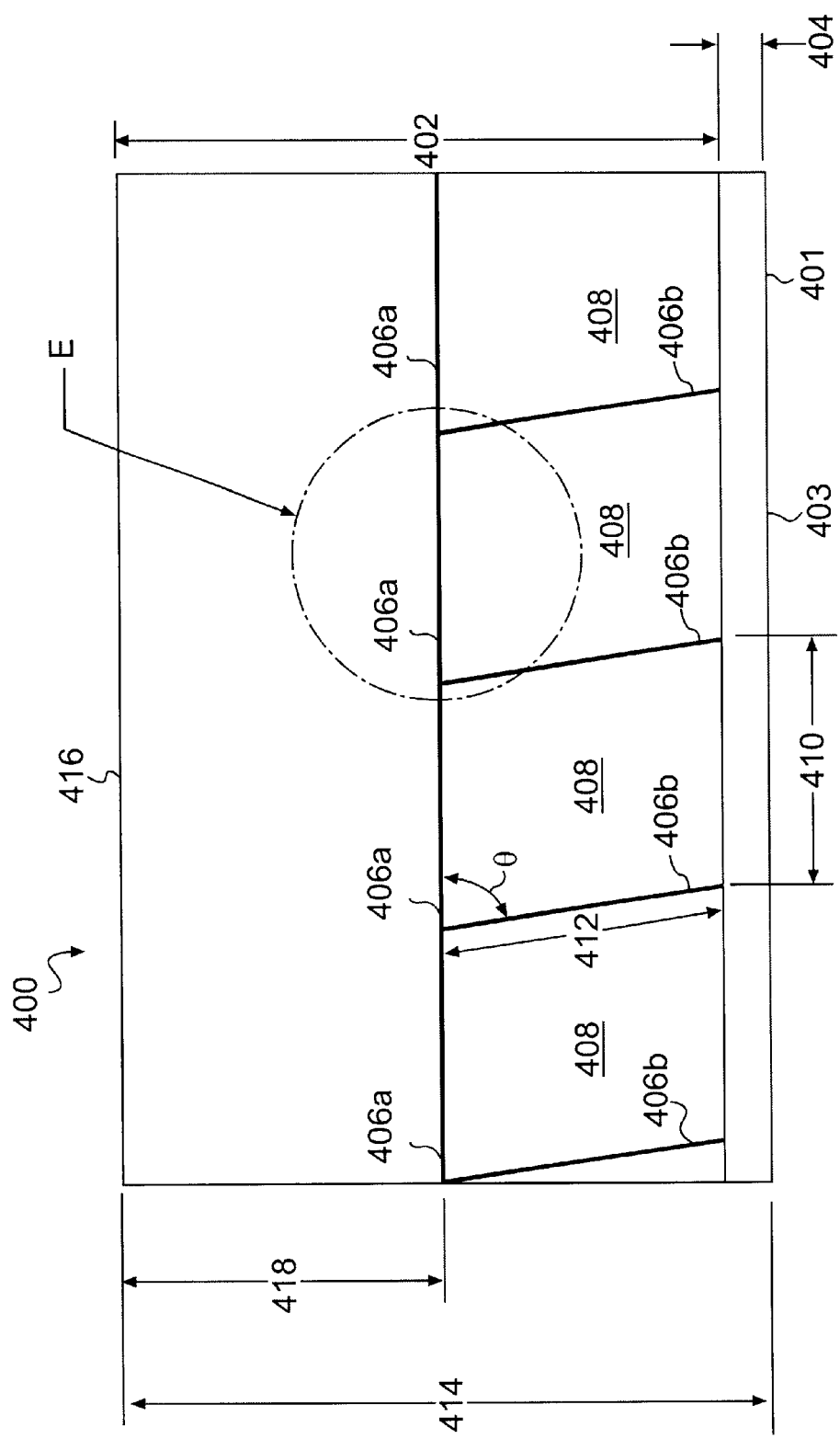
FIG. 4A is a schematic diagram of a segmented film according to an embodiment of the present invention.

FIG. 4A illustrates a high efficiency segmented metallized film 400 according to an embodiment of the present invention. As shown, film 400 includes a dielectric film 401 coated on one side with a metallized layer 402. Metallized layer 402 covers a portion of dielectric film 401, including a metallized edge 416. Opposite the metallized edge 416, metallized layer 402 stops short of an unmetallized edge 403 of dielectric film 401 to provide an uncoated area 404.

Metallized layer 402 includes margin areas 406a and 406b that divide layer 402 into segments 408. Margin area 406a is referred to herein as the center margin, and runs in a direction substantially parallel to the machine direction. Margin areas 406b are referred to herein as transverse margins, and run in a direction transverse to the edges of film 400 and to center margin 406a. As shown in FIG. 4A, transverse margins 406b are oriented at an angle θ to center margin 406a and the edge of film 400, which can range from nearly 0 to nearly 180 degrees. Preferably, angle θ ranges from approximately 10 to 20 degrees for ease of metallization.

The segments 408 provided by margin areas 406a and 406b are preferably large to increase the electrode efficiency. In preferred embodiments of the present invention, the width 410 of a segment 408 is 16 mm, with the length 412 varying from 20–50 mm.

Center margin 406a contains the fuses that provide the self-protecting properties of metallized film 400. Center margin 406a is located approximately in the center of the width 414 of film 400. In this center area, the resistivity of the electrode is more predictable and uniform, especially in comparison to the heavy edge near metallized edge 416, which typically contains heavy metallization. In an embodiment of the present invention, center margin 406a is slightly offset from the exact center of width 414 to ensure a one hundred percent open circuit when all fuses are open circuited. It is also desirable to slight offset the center margins of two opposing metallized films in a capacitor, so as to separate the fuses. In this manner, any heat generated by $I^2R$ losses in the fuse area is not concentrated in the center of the section.

As an example, center margin 406a could be located 2 mm away from the centerline of width 414. In this case, as shown in FIG. 4A, distance 418 equals:

((width 414)÷2)±2 mm).

According to a preferred embodiment of the present invention, the optimum offset value is 2 to 3 mm, which would typically place the center margin outside of the heavy edge. Alternatively, however, the center margin could be located from 2 mm away from the center to any point before the transition to the heavy edge. The transition is an area in which the metallization changes in thickness, as measured in ohms/sq, from the thickness of the body to the thickness of the heavy edge. As an example, the heavy edge could be metallized to a thickness of 1.5 to 3 ohms/sq, while the remainder of the metallized surface (i.e., the body) could be metallized to a thickness of 3 to 6 ohms/sq. The transition from the heavy edge to the body could take place over a width of 1–2 mm.

FIG. 4B illustrates the fuses 430 of center margin 406a. For each segment 408, center margin 406a includes at least one fuse. However, to provide a desirable redundancy and a preferred level of performance at operating conditions, center margin 406a includes multiple fuses. In preferred embodiments of the present invention, two to six fuses 430 are included in each segment 408 of center margin 406a. In the specific example of FIG. 4B, four fuses 430 are disposed along center margin 406a within each segment 408. As an example of the spacing of fuses 430, the distance 432 between the fuses 430 is about 4 mm, and the distance 434 between transverse margins 406b and the nearest fuses 430 is about 2 mm. This exemplary spacing provides approximately 4 mm of margin area between each fuse 430 along the length of center margin 406a.

Figure 4C:
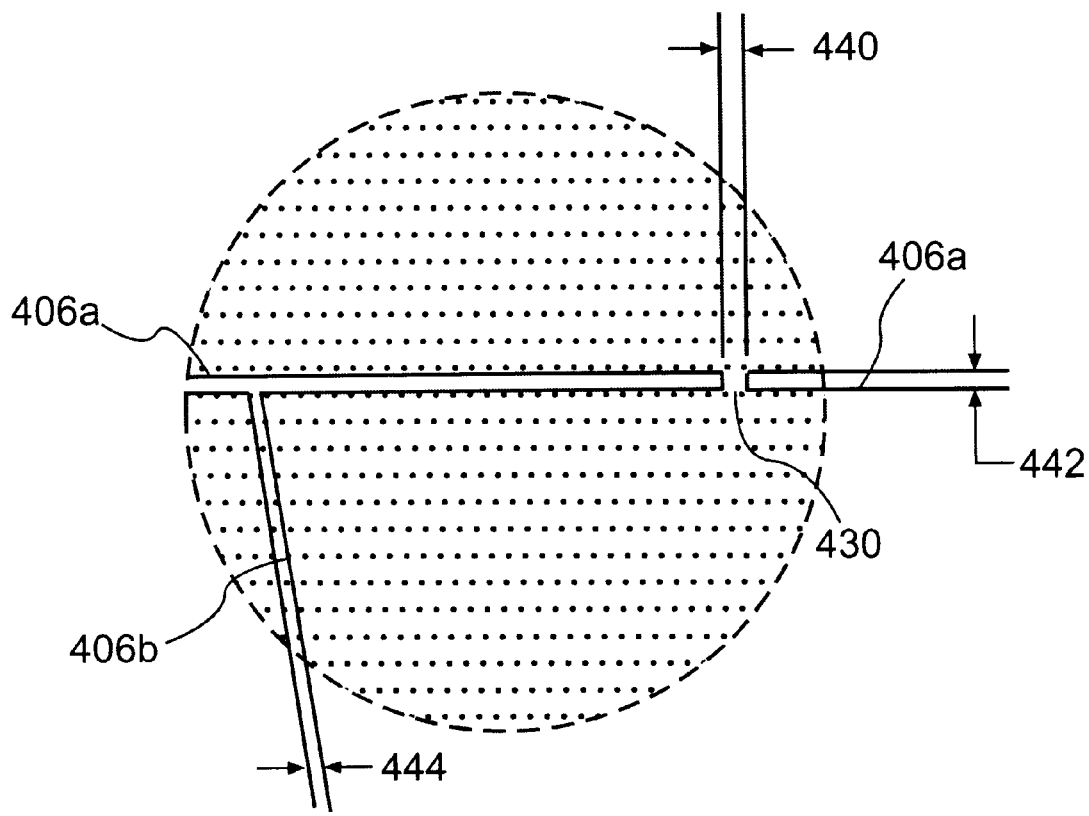
FIG. 4C is a schematic diagram showing an enlarged view of View F of FIG. 4A.

FIG. 4C shows an enlarged view of a fuse 430 and margin areas 406a and 406b. Fuse 430 is disposed in center margin 406a. In a preferred embodiment, the length 440 of fuse 430 is approximately 0.2 mm±0.05 mm, the width 442 of fuse 430 and center margin 406a is approximately 0.3 mm±0.05 mm, and the width 444 of transverse margin 406b is approximately 0.2 mm±0.05 mm.

According to a representative embodiment, the fuse length 440 of FIG. 4C ranges from about 0.10 to 3.0 mm, but is preferably about 2 mm. Although lengths in the range of 0.10 mm will perform, such designs may experience excess cap loss during the life of the capacitor. Fuse lengths of 0.30 mm or larger will perform well with regard to cap loss, but may affect the safety function of the fuse. In addition, as one of ordinary skill in the art would appreciate, a suitable fuse length also depends on the number of fuses.

Although FIG. 4C shows squared ends on center margin 406a proximate to fuse 430, the end could, of course, be other well-known shapes, such as round.

As evident from the exemplary pattern of FIGS. 4A–4C, the present invention dramatically reduces the amount of margin area needed to provide self-protecting properties. Indeed, the loss of active area from segmentation is only approximately 2%, which is a significant improvement over the 8–15% loss of the conventional patterns. This more efficient use of the metallized film translates directly into considerable cost benefits. In addition, the pattern of the present invention can facilitate a smaller case size, which can result in further cost savings.

The high efficiency segmented metallized film of the present invention can be made of any materials suitable for metallized film capacitors. Dielectric film 401 can be made of, for example, polypropylene, Mylar™, polycarbonate, polyester, polyethylene terephthalate, polystyrene, polytetrafluoroethylene, polyethylene, or combinations thereof. Metallized layer 402 can be made of, for example, aluminum, copper, zinc, or alloys thereof.

In addition, although FIGS. 4A–4C illustrate only one segmented metallized film 400, it should be understood that a substantially corresponding pattern can be formed in a second metallized film, so that the two films can be stacked and wound into a roll, with their metallized edges on opposite sides of the roll. This roll, having two segmented metallized films of the present invention, would be incorporated into a metallized film capacitor, by applying a metallic spray, attaching leads, and placing the roll in a case.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A film for self-protected capacitors, wherein the film is wound in a machine direction, the film comprising:
   (a) a dielectric film;
   (b) a metallized layer on a portion of the dielectric film such that the dielectric film has a metallized edge, an unmetallized edge, and an uncoated area between the metallized layer and the unmetallized edge,
      wherein the metallized layer has a center margin substantially parallel to the machine direction of the film,
      wherein the center margin is disposed in the metallized layer approximately equidistant to the metallized edge and to the unmetallized edge,
      wherein the metallized layer has a plurality of transverse margins running from the center margin to the uncoated area, and
      wherein the center margin and the plurality of transverse margins define a plurality of segments; and
   (c) at least one fuse disposed in the center margin within each segment of the plurality of segments,
      wherein a first region of the metallized layer is proximate to the metallized edge and a second region of the metallized layer is between the first region and the uncoated area, wherein the first region has a metallization heavier than the second region, and wherein the center margin is in the second region, and wherein a transition area is disposed between the first region and the second region.

2. The film of claim 1, wherein the at least one fuse is four fuses.

3. The film of claim 1, wherein the distance between the center margin and the metallized edge is approximately 2 mm less than the distance between the center margin and the unmetallized edge.

4. The film of claim 1, wherein the center margin is disposed within approximately 2 mm of a centerline of the dielectric film, wherein the centerline is equidistant to the metallized edge and to the unmetallized edge.

5. The film of claim 1, wherein first region is metallized to a thickness of about 1.5 to 3 ohms/sq, and wherein the second region is metallized to a thickness of about 3 to 6 ohms/sq.

6. The film of claim 1, wherein each segment is approximately 16 mm wide in the machine direction and approximately 20–50 mm in length in a direction along the plurality of transverse margins.

7. The film of claim 1, wherein the plurality of transverse margins are at an angle of approximately 10 to 20 degrees to the center margin.

8. The film of claim 1, wherein the at least one fuse is approximately 0.2 mm±0.05 mm long, wherein the at least one fuse and the center margin are approximately 0.3 mm±0.05 mm wide, and wherein the plurality of transverse margins are approximately 0.2 mm±0.05 mm wide.

9. The film of claim 1, wherein the dielectric film is at least one of polypropylene, Mylar, polycarbonate, polyester, polyethylene terephthalate, polystyrene, polytetrafluoroethylene, and polyethylene, and wherein the metallized layer is at least one of aluminum, copper, and zinc.

10. A film for self-protected capacitors, wherein the film is wound in a machine direction, the film comprising:

(a) a dielectric film;

(b) a metallized layer on a portion of the dielectric film such that the dielectric film has a metallized edge, an unmetallized edge, and an uncoated area between the metallized layer and the unmetallized edge, wherein the metallized layer has a first region proximate to the metallized edge, the first region having a first metallization, wherein the metallized layer has a second region between the first region and the uncoated area, the second region having a second metallization, wherein the first metallization is heavier than the second metallization, wherein the metallized layer has a transition area disposed between the first region and the second region, wherein the metallized layer has a center margin substantially parallel to the machine direction of the film, wherein the center margin is disposed in the second region, wherein the metallized layer has a plurality of transverse margins running from the center margin to the uncoated area, and wherein the center margin and the plurality of transverse margins define a plurality of segments; and (a) at least one fuse disposed in the center margin within each segment of the plurality of segments.

11. The film of claim 10, wherein the at least one fuse is four fuses.

12. The film of claim 10, wherein the distance between the center margin and the metallized edge is approximately 2 mm less than the distance between the center margin and the unmetallized edge.

13. The film of claims 10, wherein the center margin is disposed within approximately 2 mm of a centerline of the dielectric film, wherein the centerline is equidistant to the metallized edge and to the unmetallized edge.

14. The film of claim 10, wherein the metallized edge is a first distance from the unmetallized edge, wherein the first region is within a second distance from the metallized edge, and wherein the second distance equals half of the first distance minus approximately 2 mm.

15. The film of claim 10, wherein each segment is approximately 16 mm wide in the machine direction and approximately 20–50 mm in length in a direction along the plurality of transverse margins.

16. The film of claims 10, wherein the at least one fuse is approximately 0.2 mm±0.05 mm long, wherein the at least one fuse and the center margin are approximately 0.3 mm±0.05 mm wide, and wherein the plurality of transverse margins are approximately 0.2 mm±0.05 mm wide.

17. The film of claim 10, wherein first region is metallized to a thickness of about 1.5 to 3 ohms/sq, and wherein the second region is metallized to a thickness of about 3 to 6 ohms/sq.

18. A self-protected capacitor comprising:

(a) a housing; and (b) a capacitor roll inside the housing, the capacitor roll comprising two wound segmented metallized films, each segmented metallized film comprising a dielectric film, a metallized layer on a portion of the dielectric film such that the dielectric film has a metallized edge, an unmetallized edge, and an uncoated area between the metallized layer and the unmetallized edge, wherein the metallized layer has a center margin substantially parallel to the machine direction of the film, wherein the center margin is disposed in the metallized layer approximately equidistant to the metallized edge and to the unmetallized edge, wherein the metallized layer has a plurality of transverse margins running from the center margin to the uncoated area, and wherein the center margin and the plurality of transverse margins define a plurality of segments, and at least one fuse disposed in the center margin within each segment of the plurality of segments, and wherein the two wound segmented metallized films are stacked such that their metallized edges are on opposite sides of the capacitor roll, wherein the metallized layer has a first region proximate to the metallized edge, the first region having a first metallization, wherein the metallized layer has a second region between the first region and the uncoated area, the second region having a second metallization, wherein the first metallization is heavier than the second metallization, wherein the metallization layer has a transition area disposed between the first region and the second region, and wherein the center margin is disposed in the second region.

19. The capacitor of claim 18, wherein the distance between the center margin and the metallized edge is approximately 2 mm less than the distance between the center margin and the unmetallized edge.

20. The capacitor of claim 18, wherein the center margin is disposed within approximately 2 mm of a centerline of the dielectric film, wherein the centerline is equidistant to the metallized edge and to the unmetallized edge.

* * * * *